United States Patent Office 3,118,260
Patented Jan. 21, 1964

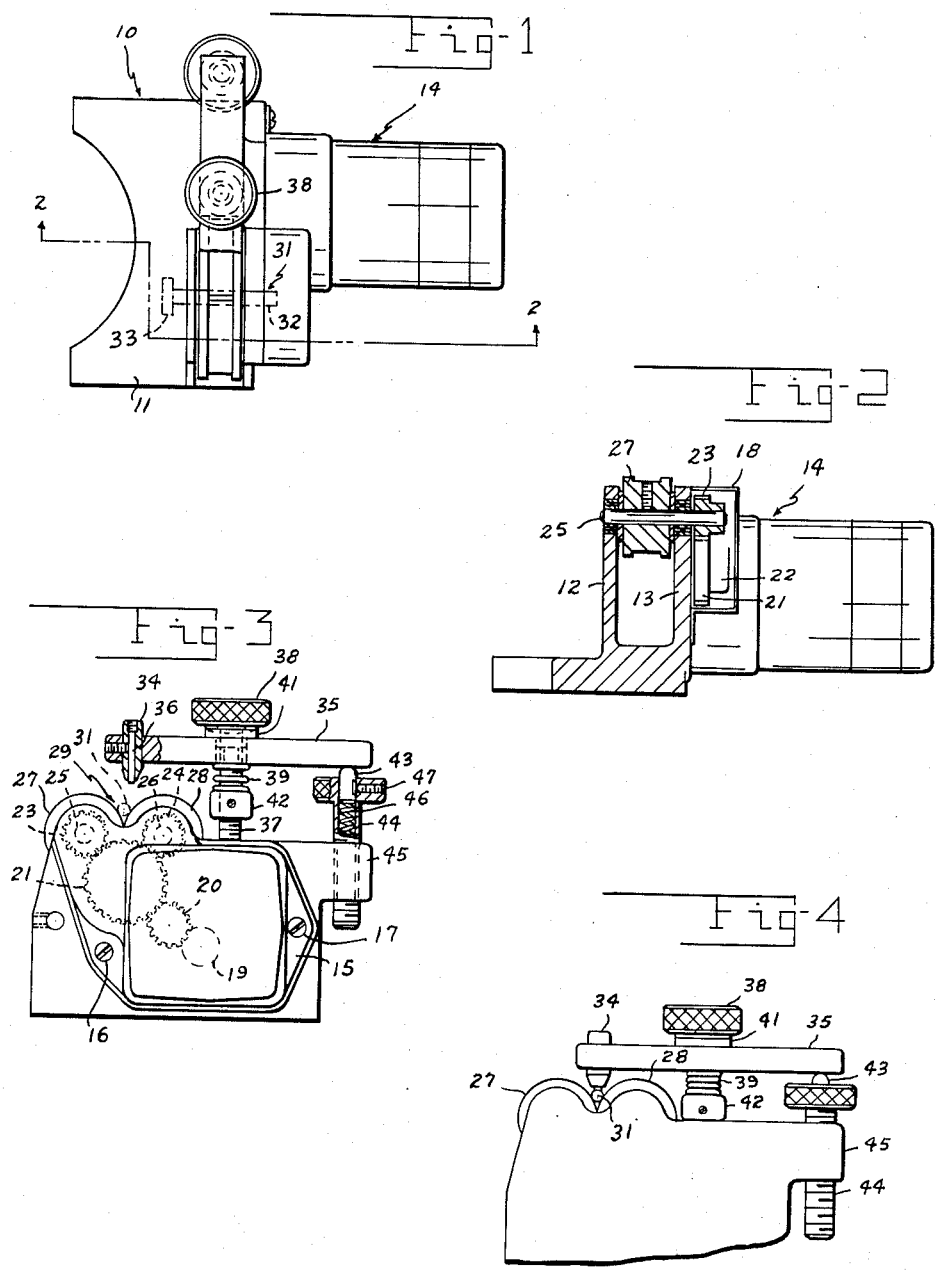

3,118,260
WORK HOLDER
Robert L. Bleicher, Dayton, Ohio, assignor to Dayton Perforators, Inc., Dayton, Ohio, a corporation of Ohio
Filed Dec. 11, 1961, Ser. No. 158,313
13 Claims. (Cl. 51—236)

This invention relates to work holding fixtures and particularly to compact, unitary devices of this class especially adapted for the fixturing of relatively small parts such as such punch points.

The object of the invention is to simplify the construction as well as the means and mode of operation of work holders, whereby such holders may not be economically manufactured, but will be more efficient and satisfactory in use, adaptable to a wide variety of applications, and be unlikely to get out of order.

A further object of the invention is to hold a workpiece by giving location, bearing and support to one diameter thereof while another is presented for the performance of grinding and like operations thereon, the arrangement being one to achieve a high degree of concentricity between the held and ground diameters.

Another object of the invention is to incorporate adjustability in the work holder so that a wide range of diameters may be accommodated at a substantially uniform holding pressure.

A further object of the invention is to provide for facile loading and unloading of a work holder as described.

Still another object of the invention is to provide for a secure holding of workpieces in a wide range of diameters, the construction and arrangement of parts enabling a gripping and holding of relatively small diameter parts without bodily interference between the holding members.

A still further object of the invention is to provide a work holder as contemplated in the foregoing objects in which the workpiece is held and rotated for the grinding of a concentric surface as described.

A further object of the invention is to provide a work holder possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a top plan view of a work holder in accordance with the illustrative embodiment of the invention, showing in dot-dash outline a workpiece installed and held therein, a portion of the holding means being broken away;

FIG. 2 is a view in longitudinal section, taken substantially along the line 2—2 of FIG. 1;

FIG. 3 is an end view of the device of FIGS. 1 and 2, portions of the holding and adjusting means being broken away, the device being shown in an open or released position relative to an installed workpiece; and FIG. 4 is a fragmentary view similar to FIG. 3, showing the work holder adjusted to a closed or gripping position relative to the installed workpiece.

Like parts are indicated by similar character of reference throughout the several views.

Referring to the drawings, a work holder in accordance with the illustrated embodiment of the invention comprises a body 10 adapted to be machine or bench mounted and providing the principal support for the operating elements of the device. The body 10 is formed with a base 11 and with integrally formed upstanding, spaced apart walls 12 and 13. The wall 13 defines what may be considered the rear of body 10. A housing 14 projects rearwardly therefrom and has a flange 15 by which it is secured through bolts 16 and 17 to the body 10.

The housing 14 mounts in its interior an electric motor (not shown) and is unitarily formed with an offset supplemental housing portion 18 serving as a transmission or gear box. Thus, the motor in housing 14 has a driving connection through a shaft 19 to a pinion 20 meshing with a gear 21 rotatably mounted in a boss 22 formed integrally with the housing 14. The gear 21 is in underlying, intermediate relation to a pair of gears 23 and 24 secured to the ends of respective shafts 25 and 26. The latter are disposed in parallel side by side relation in bearings within wall 12 and 13 and have their one ends projecting into the supplemental housing 18 for mounting of the gears 23 and 24 thereon. Between the walls 12 and 13 is disposed a pair of rollers 27 and 28 secured to respective shafts 25 and 26 for unison rotation therewith. The rollers 27 and 28 are in opposed relation with their peripheral surfaces facing one another and approximately in contact. Between the rollers there is thus created a vise-like area 29 adapted to receive the workpiece, for example a punch point 31 as diagrammatically indicated.

The workpiece 31 is disposed with its longitudinal axis transversely of the rollers 27 and 28 or in a position with its longitudinal axis intermediate and parallel to the axes of the shafts 25 and 26. The workpiece is supported by the rollers 27 and 28, lying, as indicated, in the vise area 29 in common contact with peripheral surfaces of the rollers. A first diameter 32 of the workpiece engages the rollers while a second diameter 33 thereof is projected laterally of the rollers in a manner to be presented for performance of a grinding or like operation thereof.

In overlying relation to the vise area 29 between the rollers 27 and 28 is a vertically disposed stud 34 secured in one end of a lever 35. Through an inner core 36 of appropriate antifriction material, the stud 34 is adapted to engage the workpiece 31 and hold it within area 29 in continuous contact with the rollers 27 and 28. The lever 35 is, intermediate its ends, mounted with freedom of sliding motion upon a screw post 37 set in the upper portion of body 10 and rotatably adjustable to be advanced in and retracted from said body. Extending through and upwardly of the lever 35 the post 37 has on its upper end a knurled head 38. A compression spring 39 urges the lever 35 upward to engagement with the knurled head 38 through a spacer ring 41. A collar 42 adjustable mounted on the post 37 below lever 35 provides a base for the spring 39.

At what may be considered its inner end, or that end opposite the one mounting stud 34, the lever 35 rests on a plunger 43 contained in another screw post 44 set in an offset 45 of the body 10. Plunger 43 is urged outwardly by a contained spring 46 and limited in its movement by a set screw 47 laterally disposed in the head of post 44. The plunger 43 and its mounting post 44 provides a pivot point or place of rest for one end of the lever 35. Inward axial adjustment of the post 37 while one end of the lever is engaged with plunger 43 imparts an angular impulse to the lever in one direction to apply a downward thrust to the stud 34, engaging it firmly with the workpiece. Continued downward movement of the post 37, after engagement of stud 34 with the work, is absorbed in a deflection to the springs 39 and 46 and an opposite angular motion of the lever.

The parts are shown in FIG. 3 in a position of release with respect to the workpiece 31 there shown.

Thus, the posts 37 and 44 occupy relatively elevated positions carrying the lever 35 and its stud 34 out of cooperative relation with the interposed workpiece. In FIG. 4 the work holder has been closed upon the workpiece. In so doing, the posts 37 and 44 have been turned downward into the body 10 and the lever 35 so lowered until the stud 34 engages the work. A continuing rotation of the post 37 beyond that necessary to engage the stud 34 with the work compresses springs 39 and 46 as before noted and effects a pressural engagement of the lever with the workpiece. With the work so held, energizing of the motor in housing 14 is effective through the train of gears 20, 21, 23 and 24 to rotate the rollers 27 and 28 positively and in a common direction. The result is to effect a corresponding rotation of the workpiece 31. The projecting diameter 33 thereof accordingly is presented for grinding of a surface truly concentric with the surface 32 held in the vise area 29.

According to features of the invention the work holder may be seen to accommodate workpieces within a substantial range of diameters with the lever 35 being adjustable as described to apply a uniform holding pressure to the work irrespective of its size. The construction and arrangement of parts is, however, one particularly lending itself to the fixturing of small diameter parts inasmuch as the stud 34 may penetrate deeply into the vise area 29 without infringing upon the zones of movement of the rollers 27 and 28. In utilization of the fixture to hold and grind successive, duplicate parts a finished part can be released by backing off post 37 only while post 44 remains positioned inwardly in the body. Then, upon the next succeeding part being placed in the work holder, the post 37 will, when screwed inwardly, position the lever 35 exactly as before and apply through it the same pressure, with the same degree of concentricity between the multiple diameters resulting.

While the instant fixture has been shown as comprising a unitary motor for powered operation of the rollers 27 and 28 it is adaptable for hand operation, as, for example, by attaching a crank to the gear 21 at the axis thereof.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A work holder for providing location, bearing and support for a multiple diameter workpiece by engaging the piece at one diameter while another is presented for working, including a body, a pair of rollers in opposing laterally spaced relation on said body, means for rotating said rollers in a common direction, the workpiece being placed between and on said rollers and supported thereby with said one diameter of the workpiece in common contact with said rollers, a screw post set in said body, a lever carried by said screw post and adapted to be raised and lowered relative said body on relative rotation of said post, a stud on one portion of said lever movable thereby into cooperative relation with said rollers for mutual engagement therewith of the workpiece positioned between and on said rollers and means on said body remote from said stud providing a free bearing pivot for said lever controlling the angular movement thereof referenced to said body.

2. A work holder for providing location, bearing and support for a multiple diameter workpiece by engaging the piece at one diameter while another is presented for working, including a body, a pair of relatively rolling bearing supports on said body for said workpiece jointly engaging said one diameter thereof at circumferentially spaced points, other bearing means on said body, a member mounting said other bearing means to be relatively adjustable for pressural engagement with said one diameter of the workpiece in circumferentially spaced relation to said pair of rolling bearing supports, said member comprising a lever and said other bearing means a stud thereon for engaging the workpiece in free bearing relation thereto, further bearing means on said body providing a rest for one end of said lever and support means mounting said lever for adjustment to and from said body while said rest affords a pivot therefor.

3. A work holder for providing location, bearing and support for a multiple diameter workpiece by engaging the piece at one diameter while another is presented for working, including a body, an upstanding screw post set in said body and rotatably adjustable to move in relative entering and retracting motions with reference to said body, a lever in overlying relation to said body and supported intermediate its ends on said screw post, a downwardly projecting stud carried by said lever at one end thereof, a free bearing pivot support on said body for the other end of said lever, and a pair of rotatable rollers supported by said body in adjacent parallel relation with their peripheral surfaces in opposed aligned relation, the said stud on said lever overlying said rollers and cooperating therewith to obtain a three point contact with an interposed workpiece upon an entering adjustment of said screw post, said stud being adapted for relatively deep penetration between said rollers without infringing on the zones of movement thereof.

4. A work holder according to claim 3, characterized by means for rotating said rollers in a common direction, the workpiece being held by said stud against said rollers for rotary movement thereby.

5. A work holder for providing location, bearing and support for a multiple diameter workpiece by engaging the piece at one diameter while another is presented for working, including a body, a pivot post set in said body, a lever having one end freely bearing on said post, said post incorporating a yieldable tip to engage said lever, a bearing stud on the other end of said lever, roller means on said body defining a vise area in underlying relation to said bearing stud for receiving a workpiece therebetween within said vise area, and another post anchored in said body for variable projection therefrom and carrying said lever intermediate its ends, adjustment of said other post to lower said lever causing said stud to engage the workpiece and causing the said one end of the lever to limit upon said pivot post, continued adjustment of said other post applying pressure to the workpiece as said lever moves angularly against the yielding resistance of said pivot post.

6. A work holder according to claim 5, characterized in that said pivot post is longitudinally adjustable in said body for substantial uniform gripping of workpieces of different diameter.

7. A work holder according to claim 5, characterized by a yielding connection of said lever to said other post.

8. A work holder particularly advantageous for a workpiece one portion of which is to be formed concentric to another consisting of, a support, a pair of rollers mounted for rotation on said support, said rollers being in co-planar immediately adjacent relation to rotatably mount a portion of a workpiece thereon and nested therebetween, a pair of longitudinally spaced posts on said support generally aligned with said rollers and spaced therefrom, a lever, one of said posts providing a sliding mount for said lever intermediate its extremities, the other of said posts forming an abutment for one extremity of said lever, means dependent from the other extremity of said lever providing a free bearing surface for abutment with a workpiece mounted on and between said rollers to contain a workpiece thereto at one portion while another portion may be formed concentric therewith and means on said one post to provide a pivoting of said lever referenced to said other post for movement of said dependent means to and from said workpiece.

9. The structure as set forth in claim 8 characterized by said lever being apertured to receive said one post therethrough, and said last named means including spring means interposed between said support and said lever and means on said post providing for adjustment of said lever relative said support.

10. The structure as set forth in claim 8 characterized by said other post being formed to resiliently accommodate the abutment of said lever therewith for pivoting of said lever relative thereto.

11. A work holder particularly advantageous for a workpiece one portion of which is to be formed concentric to another consisting of, a support, a plurality of rollers mounted for rotation on said support, said rollers being paired in co-planar immediately adjacent relation to rotatably mount a portion of a workpiece thereon and nested therebetween, longitudinally spaced posts on said support in general alignment with said paired rollers and spaced therefrom, lever means cooperating with paired rollers having a sliding mount on one of said posts intermediate its extremities, another of said posts providing a pivot for one extremity of the lever means, means on the other extremity of the lever means providing a free bearing surface for abutment with a workpiece mounted on and between said pair of rollers to contain the workpiece thereto at one portion while another portion may be formed concentric therewith.

12. A work holder particularly advantageous for a workpiece one portion of which is to be formed concentric to another consisting of a support, paired rollers mounted for rotation on said support in co-planar immediately adjacent relation to rotatably mount a portion of a workpiece thereon and nested therebetween, lever means mounted on said support for movement to and from said support intermediate its extremities, means providing a free bearing pivot for one end of the lever means and means depending from the opposite end of said lever means providing a free bearing surface for abutment with a workpiece mounted on and between said paired rollers to contain a workpiece thereto at one portion while another portion may be formed concentric therewith and means engaged with said intermediately supported portion of said lever means for movement thereof relative said support.

13. The structure set forth in claim 12 characterized by said means providing the free bearing pivot for one end of said lever means having an adjustable connection reference to said support to vary the orientation of the pivot for said one end of the lever means.

References Cited in the file of this patent

UNITED STATES PATENTS

| | | |
|---|---|---|
| 1,452,508 | Hervig | Apr. 24, 1923 |
| 1,729,780 | Holmes | Oct. 1, 1929 |
| 1,733,095 | Holmes | Oct. 22, 1929 |
| 2,427,283 | Hopkins et al. | Sept. 9, 1947 |
| 2,505,168 | Augustin | Apr. 25, 1950 |
| 2,741,074 | Kopezynski | Apr. 10, 1956 |
| 2,756,547 | Rippl | July 31, 1956 |
| 2,796,899 | Biro | June 25, 1957 |
| 3,041,691 | Vanier | July 3, 1962 |

FOREIGN PATENTS

| | | |
|---|---|---|
| 152,632 | Great Britain | May 18, 1920 |
| 274,022 | Great Britain | Dec. 1, 1927 |
| 471,133 | Great Britain | Aug. 30, 1937 |
| 810,002 | Germany | Aug. 6, 1951 |